United States Patent
Koishikawa et al.

(10) Patent No.: US 10,118,662 B2
(45) Date of Patent: Nov. 6, 2018

(54) SADDLE TYPE VEHICLE

(71) Applicant: HONDA MOTOR CO., LTD., Tokyo (JP)

(72) Inventors: Takuma Koishikawa, Wako (JP); Edward Birtulescu, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

(21) Appl. No.: 15/281,322

(22) Filed: Sep. 30, 2016

(65) Prior Publication Data

US 2017/0101151 A1    Apr. 13, 2017

(30) Foreign Application Priority Data

Oct. 9, 2015    (JP) ................................. 2015-201591

(51) Int. Cl.
    *B62K 11/04*    (2006.01)
    *B62J 1/08*    (2006.01)

(52) U.S. Cl.
    CPC ................. *B62K 11/04* (2013.01); *B62J 1/08* (2013.01)

(58) Field of Classification Search
    CPC .............................. B62K 11/02; B62K 11/04
    See application file for complete search history.

(56) References Cited

U.S. PATENT DOCUMENTS 4,537,273 A * 8/1985 Funabashi .............. B60K 11/04
                                                              180/229
2014/0035269 A1    2/2014 Hagimoto et al.

FOREIGN PATENT DOCUMENTS

| JP | 62-52588 U | 4/1987 |
| JP | 5-193543 A | 8/1993 |
| JP | 2002-087360 A | 3/2002 |
| JP | 2004-116426 A | 4/2004 |
| JP | 2014-43235 A | 3/2014 |

* cited by examiner

*Primary Examiner* — Kevin Hurley
(74) *Attorney, Agent, or Firm* — Birch, Stewart, Kolasch & Birch, LLP (57) ABSTRACT

A saddle type vehicle having a seat frame connected to the rear of a main frame wherein the vehicle body width of a periphery of the seat is suppressed to improve the boarding. The saddle type vehicle includes a head pipe, a main frame extending obliquely downwardly from the head pipe, and a seat frame for supporting a seat. The main frame has a third extension inclined so as to be positioned on the inner side in a widthwise direction toward the rear of the vehicle. The seat frame is connected at a front end portion thereof to the third extension. The seat frame has a first inclination portion inclined so as to be positioned on the inner side in the widthwise direction toward the rear of the vehicle from the front end portion.

17 Claims, 9 Drawing Sheets

SADDLE TYPE VEHICLE

CROSS-REFERENCE TO RELATED APPLICATIONS

The present application claims priority under 35 USC 119 to Japanese Patent Application No. 2015-201591 filed Oct. 9, 2015 the entire contents of which are hereby incorporated by reference.

BACKGROUND OF THE INVENTION

1. Field of the Invention

The present invention relates to a saddle type vehicle.

2. Description of Background Art

A saddle type vehicle is known as disclosed, for example, in Japanese Patent Laid-Open No. 2002-87360. In the saddle type vehicle disclosed in Japanese Patent Laid-Open No. 2002-87360, a seat frame is connected at a front end portion thereof to a portion of a main frame which is widened to the outer sides in a widthwise direction (leftward and rightward direction).

In the configuration described above, since the seat frame is connected at a front end portion thereof to a portion of the main frame which is widened to the outer sides in the widthwise direction, a periphery of the seat is liable to project to the outer sides in the widthwise direction. Therefore, the saddle type vehicle has room for improvement to improve the boarding of an occupant on the vehicle, namely, the straddling.

SUMMARY AND OBJECTS OF THE INVENTION

Therefore, it is an object of an embodiment of the present invention, in a saddle type vehicle in which a seat frame is connected to the rear of a main frame, to suppress the vehicle body width of a periphery of the seat to improve the boarding.

As means for solving the problem described above, according to an embodiment of the present invention, there is provided a saddle type vehicle (1) including a head pipe (21); a main frame (22) extending in a vehicle rearward direction from the head pipe (21); and a seat frame (25) connected to a rear of the vehicle of the main frame (22). The main frame (22) has a first inclination portion (32e) inclined so as to be positioned on an inner side in a widthwise direction toward the rear of the vehicle, the seat frame (25) is connected at a front end portion thereof to the first inclination portion (32e), and the seat frame (25) has a second inclination portion (56a) inclined so as to be positioned on the inner side in the widthwise direction toward the rear of the vehicle from the front end portion of the seat frame (25).

According to an embodiment of the present invention, the saddle type vehicle in general is a vehicle wherein a driver boards astride a vehicle body and includes not only a motorcycle but also three-wheeled (including not only a type which includes one front wheel and two rear wheels but also a different type which includes two front wheels and one rear wheel) or four-wheeled vehicles.

According to an embodiment of the present invention, the saddle type vehicle is configured such that the second inclination portion (56a) of the seat frame (25) is provided in an inclined relationship so as to be positioned on the inner side in the widthwise direction than the first inclination portion (32e) of the main frame (22) as viewed in a top plan view.

According to an embodiment of the present invention, the saddle type vehicle is configured such that the seat frame (25) includes a first seat frame (46) inclined so as to be positioned downwardly toward the rear of the vehicle; and a second seat frame (45) inclined so as to be positioned upwardly toward the rear of the vehicle. The first seat frame (46) is connected at a rear end portion thereof to an intermediate portion in the forward and rearward direction of the second seat frame (45). The second seat frame (45) supports, at a rear portion thereof, a seat (16) from a lower rear side.

According to an embodiment of the present invention, the saddle type vehicle is configured such that the second seat frame (45) is formed from a continuous pipe material in such a manner so as to extend along an outer profile of the seat (16) as viewed in a top plan view.

According to an embodiment of the present invention, the saddle type vehicle is configured such that the first seat frame (46) is formed from a pipe material of a diameter smaller than that of the second seat frame (45).

According to an embodiment of the present invention, the saddle type vehicle is configured such that an article disposition space (K2) is formed between the first seat frame (46) and a bottom plate (16c) of the seat (16).

According to an embodiment of the present invention, the saddle type vehicle is configured such that the second seat frame (45) of a frame shape is formed so as to extend along the outer profile of the seat (16) as viewed in a top plan view. A seat supporting member (68), fixed to an inner side of the second seat frame (45) and capable of supporting an inner side of the outer profile of the seat (16) as viewed in a top plan view is provided in the rear of the article disposition space (K2) in the vehicle forward and rearward direction.

According to an embodiment of the present invention, the saddle type vehicle is configured such that the seat supporting member (68) has a flat plate portion (68a) which supports the bottom plate (16c) of the seat (16) on a front face side thereof. A different vehicle component (72) is supported on a rear face side of the flat plate portion (68a).

According to an embodiment of the present invention, the saddle type vehicle is configured such that it further includes a down frame (23) extending downwardly from the head pipe (21); a pivot frame (24) coupled to a rear portion of the main frame (22); and an engine (10) mounted so as to be surrounded by the down frame (23), the pivot frame (24), and the main frame (22). The down frame (23) and the pivot frame (24) are connected to each other through the engine (10).

According to an embodiment of the present invention, since the front end portion of the seat frame is connected to the first inclination portion which narrows to the inner side in the widthwise direction of the main frame, a peripheral portion of the seat is less likely to project to the outer side in the widthwise direction. Further, since the second inclination portion which narrows in the widthwise direction is provided also behind the front end portion of the seat frame, swelling of the seat frame just below the seat to the outer side in the widthwise direction is suppressed. Consequently, the width of the vehicle body around the seat can be suppressed, and the boarding property (striding property) can be improved.

According to an embodiment of the present invention, since the second inclination portion of the seat frame is inclined to the rather inner side in the widthwise direction in the rear of the second inclination portion of the main frame, the inclination of the main frame can be suppressed thereby to enhance the degree of freedom in design and the vehicle body width of the seat frame just below the seat can be suppressed thereby to further improve the striding property.

According to an embodiment of the present invention, since the height of the seat is reduced by the rearwardly downwardly inclined first seat frame, the ground accessibility can be improved, and the load applied to the seat from the occupant upon acceleration of the vehicle can be supported firmly by the rear portion of the second seat frame.

According to an embodiment of the present invention, assurance of the rigidity and fabrication of the seat frame are facilitated, and the load applied to the seat from the occupant upon acceleration of the vehicle can be supported more firmly by the second seat frame extending along the outer profile of the seat.

According to an embodiment of the present invention, since the first seat frame which supports the front portion of the seat is thinner than the second seat frame which supports the rear portion of the seat, it is possible to suppress the vehicle body width of the front portion of the seat frame and further improve the striding property.

According to an embodiment of the present invention, the space below the front portion of the seat can be utilized as an article disposition space or an article accommodation unit, and the convenience can be improved.

According to an embodiment of the present invention, since the seat is supported over a wide area using the seat supporting member in addition to the second seat frame, the load applied to the seat from the occupant upon acceleration of the vehicle can be supported more firmly.

According to an embodiment of the present invention, the space on the rear face side of the flat plate portion of the seat supporting member can be effectively used as a part disposition space and the flat plate portion of the seat supporting member can be used also as a protective member for the vehicle component.

According to an embodiment of the present invention, the engine is utilized as a rigid member of the vehicle body frame, and therefore, a frame member for connecting the down frame and the pivot frame to each other can be eliminated and reduction in weight of the vehicle can be anticipated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of the present invention is described with reference to the drawings. It is to be noted that, unless otherwise specified, the directions such as forward, rearward, leftward, and rightward directions in the following description are same as those of a vehicle described below. Further, at a suitable location in any figure referred to in the following description, an arrow mark FR indicates the forward direction, another arrow mark LH indicates the leftward direction, a further arrow mark UP indicates the upward direction, or a line CL indicates the center of the vehicle in the leftward and rightward direction.

Figure 1:
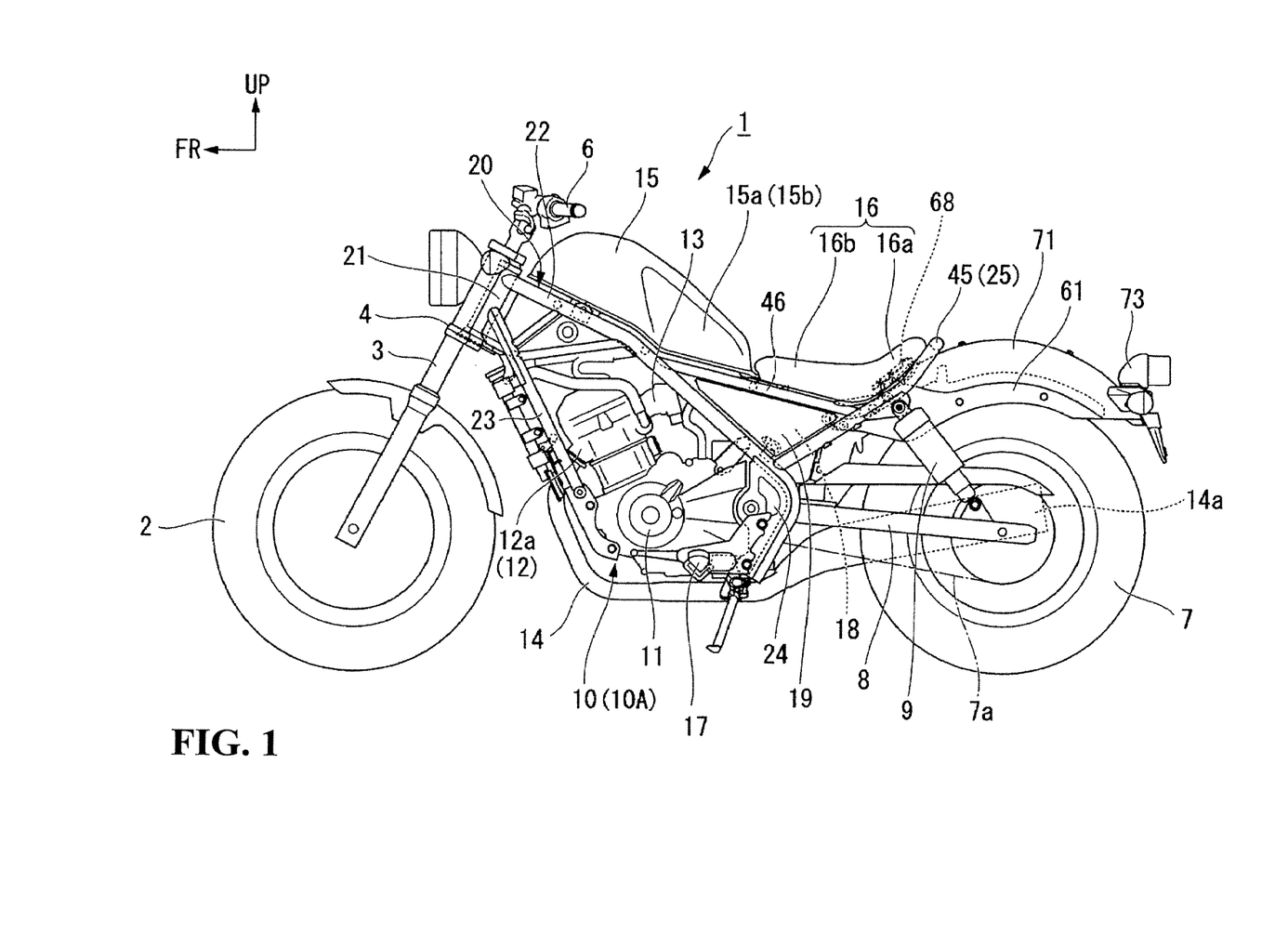
FIG. 1 is a left side elevational view of a motorcycle according to an embodiment of the present invention.
Figure 2:
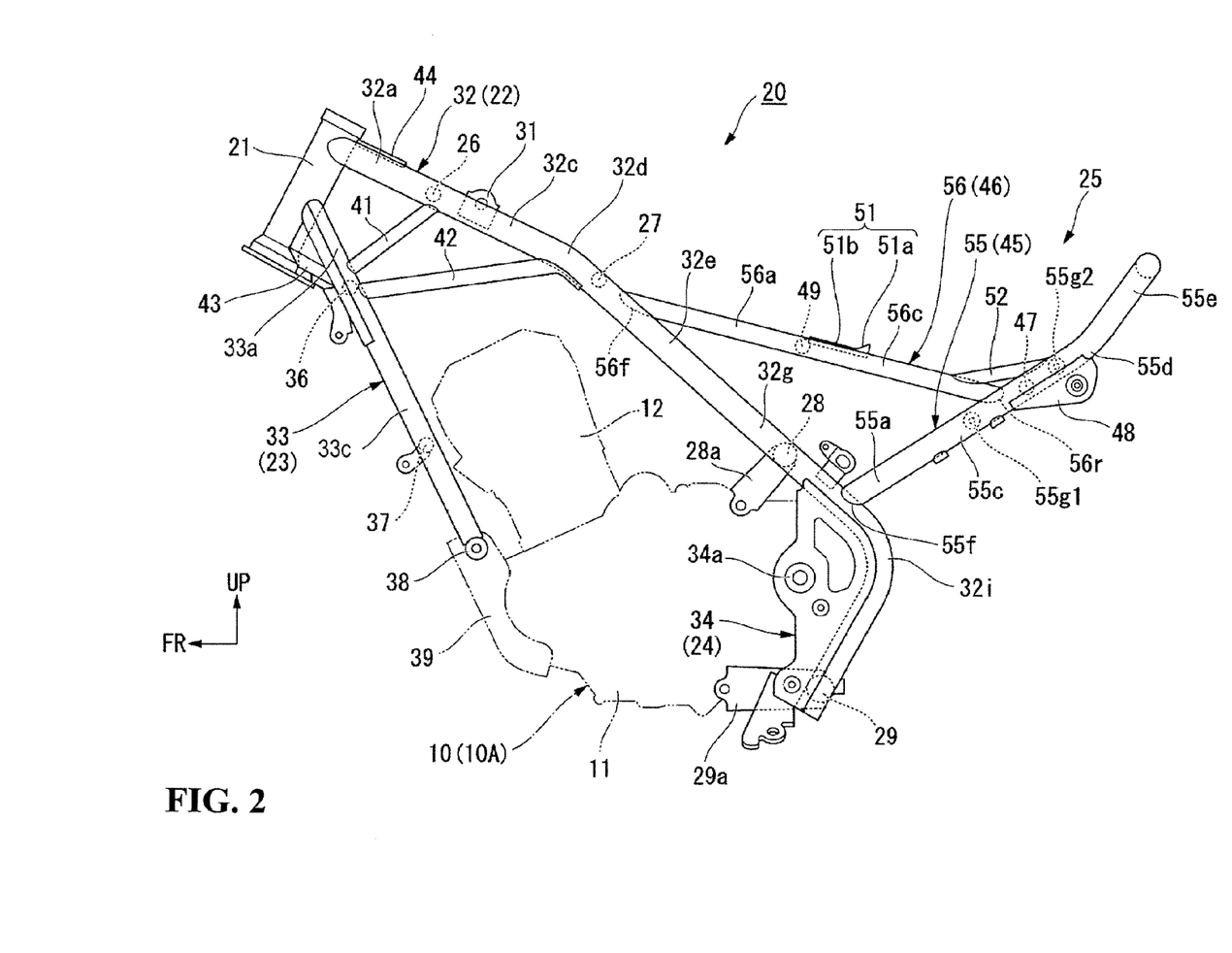
FIG. 2 is a left side elevational view of a vehicle body frame of the motorcycle.
Figure 3:
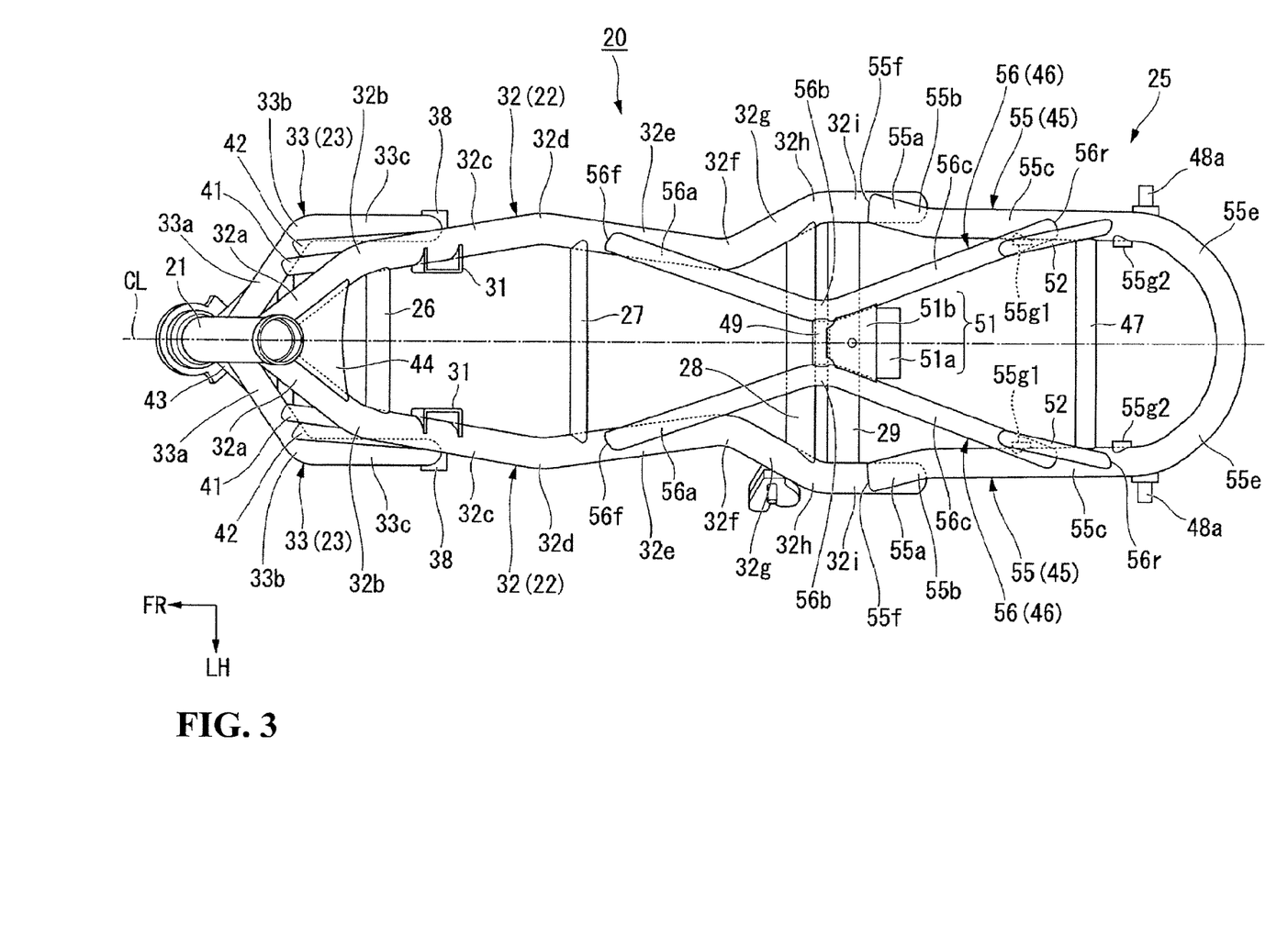
FIG. 3 is a top plan view of the vehicle body frame.
Figure 4:
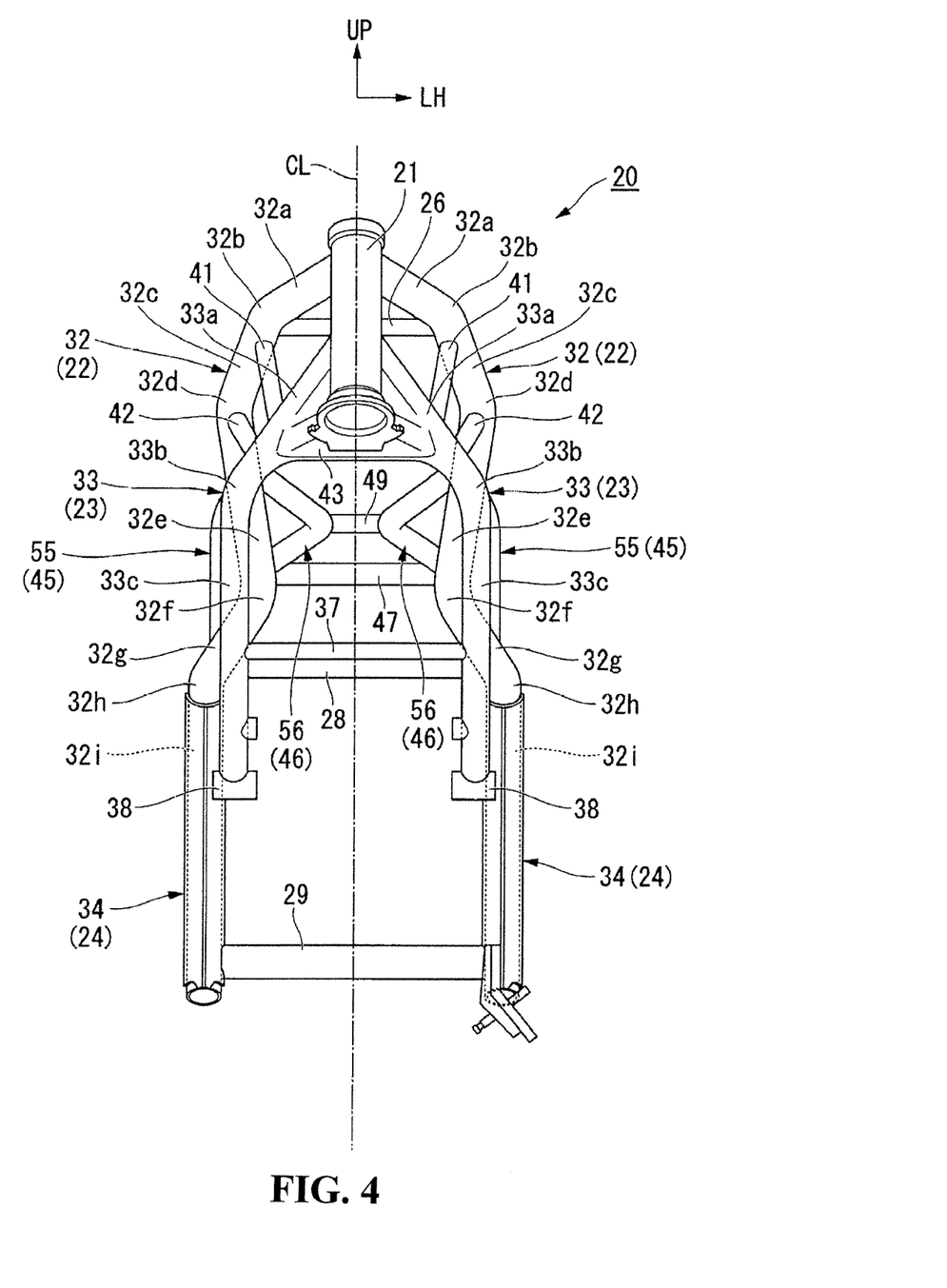
FIG. 4 is a front elevational view of the vehicle body frame.
Figure 5:
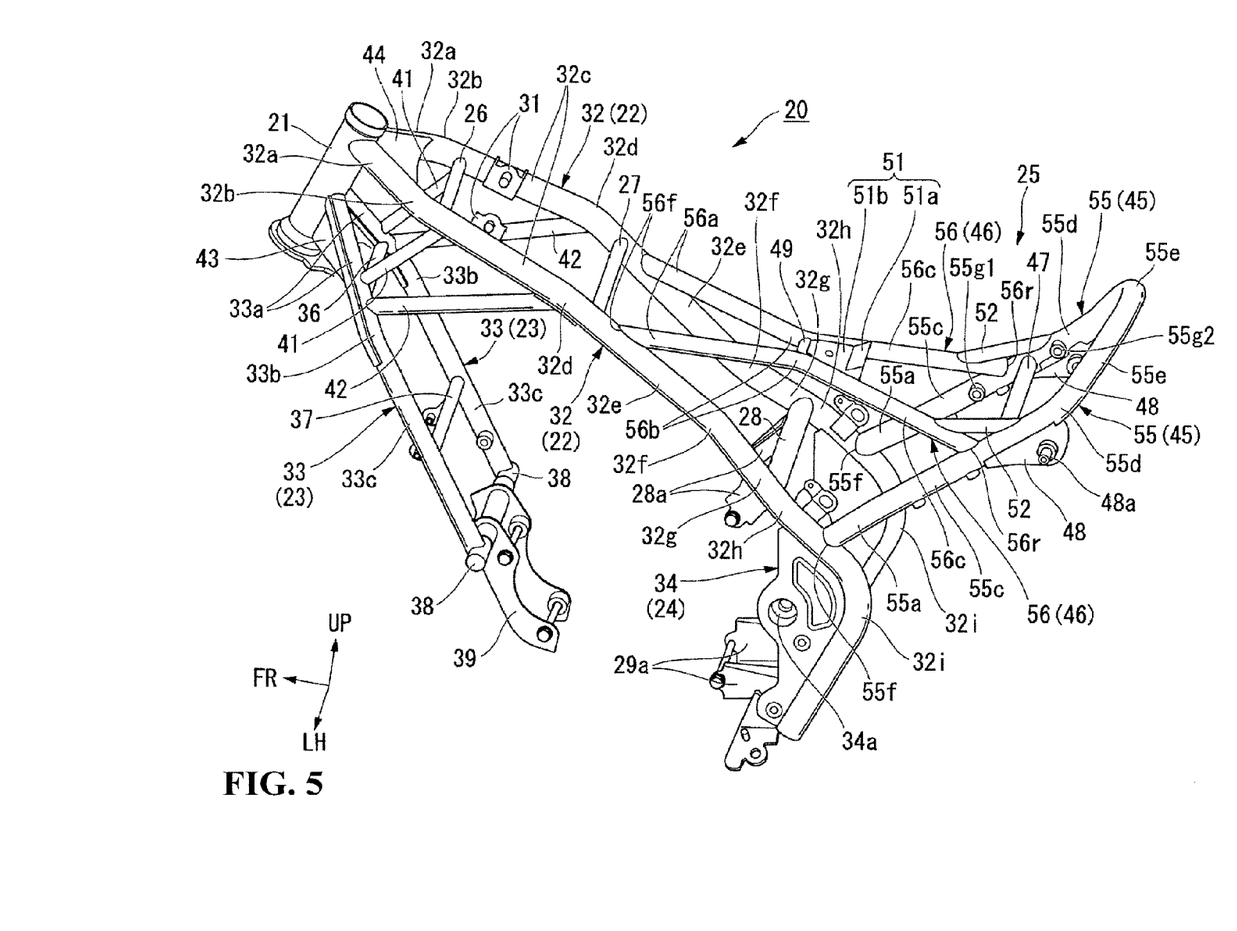
FIG. 5 is a perspective view of the vehicle body frame.

A motorcycle (saddle type vehicle) 1 depicted in FIG. 1 is a vehicle of the cruiser type having a low and elongated vehicle body. A front wheel 2 of the motorcycle 1 is supported at a lower end portion of a pair of left and right front forks 3 provided at a front portion of the vehicle body and inclined such that an upper portion is positioned on the rear side. The left and right front forks 3 are supported at an upper portion thereof to a front end portion of a vehicle body frame 20 through a steering stem 4. A handle bar 6 for steering is attached to an upper portion of the steering stem 4.

A rear wheel 7 of the motorcycle 1 is supported at a rear end portion of a swing arm 8 extending in a forward and rearward direction on the lower side of a rear portion of the vehicle body. The swing arm 8 is supported at a front end portion thereof for upward and downward rocking motion on the lower side of a rear portion of the vehicle body frame 20. The rear wheel 7 is connected to a power unit 10A, which is a prime mover of the motorcycle 1, through a power train 7a of the chain type disposed, for example, on the right side of a rear portion of the vehicle body. A pair of left and right rear shock absorbers 9 are connected at a lower end portion thereof to a rear portion of left and right arms of the swing arm 8.

The power unit 10A is mounted on the inner side of the vehicle body frame 20. The power unit 10A includes an engine (internal combustion engine) 10 having a crankshaft extending along the widthwise direction (leftward and rightward direction). The engine 10 has a cylinder 12 erected upwardly from a front portion of a crankcase 11. A rear portion of the crankcase 11 forms a transmission case which accommodates a transmission therein.

An intake path 13 including a throttle unit and so forth is connected to a rear portion of a cylinder head 12a of the cylinder 12. An exhaust pipe 14 is connected at a base end portion thereof to a front portion of the cylinder head 12a. The exhaust pipe 14 is curved to the rear side in front of the engine 10 and extends rearwardly below the engine 10 until it is connected to an exhaust muffler 14a disposed, for example, on the right side of a rear portion of the vehicle body.

Above the engine 10, a fuel tank 15 for storing fuel for the engine 10 therein is disposed. A seat 16 is disposed behind the fuel tank 15 on which a rider is to be seated. In front of and below the seat 16, a pair of left and right steps 17 are disposed such that the rider can place his or her feet thereon.

Auxiliaries 18 such as an air cleaner are disposed below a rear portion of the fuel tank 15 and a front portion 16*b* of the seat 16. The auxiliaries 18 are supported on the inner side of the vehicle body frame 20 and covered with side covers 19 attached to the vehicle body frame 20 from the opposite left and right outer sides.

It is to be noted that, although the motorcycle 1 of the present embodiment does not include a seat and steps for a rear passenger, it may be configured otherwise such that it has the seat and the steps for a rear passenger thereon.

Referring also to FIGS. 2 to 5, the vehicle body frame 20 is formed by integrally coupling a plurality of different steel materials by welding or the like.

The vehicle body frame 20 includes a head pipe 21, a main frame 22, a down frame 23, a pivot frame 24, and a seat frame 25. The head pipe 21 is positioned at a front end portion of the vehicle body frame 20 and supports the steering stem 4 thereon. The main frame 22 includes a pair of left and right main frame pipes 32 branching leftwardly and rightwardly from the rear side of an upper portion of the head pipe 21 and extending downwardly rearwardly as viewed in a side elevational view. The down frame 23 includes a pair of left and right down frame pipes 33 branching leftwardly and rightwardly from the rear side of a lower portion of the head pipe 21 and extending rearwardly downwardly in a steeper inclination than the main frame pipes 32 as viewed in a side elevational view. The pivot frame 24 includes a pair of left and right pivot frame members 34 joined to a rear portion of the left and right main frame pipes 32 and supporting a front end portion of the swing arm 8. The seat frame 25 is joined at a front end portion thereof to a rear upper portion of the main frame 22 and extends rearwardly.

The head pipe 21 has a cylindrical shape and has a center axial line disposed at the center in the widthwise direction and besides is disposed in an inclined relationship as viewed in a side elevational view such that an upper portion thereof is positioned on the rear side.

Each of the left and right main frame pipes 32 includes a first extension 32*a*, a second extension 32*c*, a third extension 32*e*, a fourth extension 32*g*, and a rear curved shape portion 32*i*. The first extension 32*a* extends rearwardly from the rear side of an upper portion of the head pipe 21 such that it extends, as viewed in a side elevational view, downwardly and rearwardly in an inclined relationship and, as viewed in a top plan view, to the left or right outer side in an inclined relationship. The second extension 32*c* is connected to the rear of the first extension 32*a* through a first curved portion 32*b* and extends, as viewed in a side elevational view, in an aligned relationship with the first extension 32*a* and, as viewed in a top plan view, to the left or right outer side in an inclined relationship by a looser gradient than the first extension 32*a*. The third extension 32*e* is connected to the rear of the second extension 32*c* through a second curved portion 32*d* and extends, as viewed in a side elevational view, downwardly rearwardly in an inclined relationship by a steeper gradient than the second extension 32*c* and, as viewed in a top plan view, to the left or right inner side in an inclined relationship. The fourth extension 32*g* is connected to the rear of the third extension 32*e* through a third curved portion 32*f* and extends, in a side elevational view, in an aligned relationship with the third extension 32*e* and, as viewed in a top plan view, to the left or right outer side in an inclined relationship. The rear curved shape portion 32*i* is connected to the rear of the fourth extension 32*g* through a fourth curved portion 32*h* and extends, as viewed in a side elevational view, first in an aligned relationship with the fourth extension 32*g* and then forwardly downwardly in a curved state and, as viewed in a top plan view, substantially in parallel to a side face of the vehicle body. It is to be noted that the side face of the vehicle body forms a plane orthogonal to the widthwise direction (leftward and rightward direction).

The left and right main frame pipes 32 are individually formed integrally by the bending or the like of a round steel pipe.

The rear curved shape portion 32*i* extends linearly to the lower front side below a portion thereof curved in an arc projection rearwardly as viewed in a side elevational view. The pivot plate member 34 having a substantially crescent shape as viewed in a side elevational view is joined to the front face side (inner circumference side) of the rear curved shape portion 32*i*. A pivot portion 34*a* is provided at a front portion of each of the left and right pivot frame members 34 and supports a rocking shaft (pivot shaft) of the swing arm 8. The pivot plate member 34 is formed by presswork of a steel plate, casting or the like. The rear curved shape portion 32*i* of each of the left and right main frame pipes 32 serves also as part of the pivot frame 24. The main frame 22 includes a portion which extends across the head pipe 21 and the pivot frame 24.

A first cross frame 26 extends across front portions of the second extensions 32*c* of the left and right main frame pipes 32.

A second cross frame 27 extends across front portions of the third extensions 32*e* of the left and right main frame pipes 32.

A third cross frame 28 extends across rear portions of the fourth extensions 32*g* of the left and right main frame pipes 32.

A fourth cross frame 29 extends across lower front portions of the rear curved shape portions 32*i* of the left and right main frame pipes 32.

The cross frames 26 to 29 are each formed from a round steel pipe extending in the leftward and rightward direction.

A tank front supporting bracket 31 is joined to each of the right and left inner sides of the second extensions 32*c* of the left and right main frame pipes 32 and supports the lower side of front portions of the fuel tank 15.

A rear upper mount bracket 28*a* is joined to the third cross frame 28 and extends forwardly downwardly to support the upper side of a rear portion of the crankcase 11.

A rear lower mount bracket 29*a* is joined to the fourth cross frame 29 and extends forwardly to support the lower side of a rear portion of the crankcase 11.

The vehicle body frame 20 has a diamond frame structure which utilizes the engine 10 (power unit 10A) as part of its frame structure. The engine 10 is mounted so as to be surrounded by the main frame 22, the down frame 23, and the pivot frame 24 as viewed in a side elevational view and is connected at a lower portion of the down frame 23 to a rear portion of the main frame 22 and the pivot frame 24.

In the motorcycle 1, the cylinder 12 of the engine 10 is not connected to the vehicle body frame 20. However, the second cross frame 27 is provided between the left and right main frame pipes 32 to improve the torsional rigidity of the vehicle body frame 20.

Each of the left and right down frame pipes 33 has a first extension 33*a* and a second extension 33*c*. The first extension 33*a* extends rearwardly from the lower rear side of the head pipe 21 and particularly extends in a downwardly rearwardly inclined relationship as viewed in a side elevational view and in a leftwardly or rightwardly outwardly inclined relationship as viewed in a top plan view. The second extension 33c is connected to a lower portion of the first extension 33a through a first curved portion 33b and extends linearly to the first extension 33a as viewed in a side elevational view and substantially in parallel to a side face of the vehicle body as viewed in a top plan view.

The left and right down frame pipes 33 are each formed as a unitary member by the bending of a round steel pipe or the like.

A first cross frame 36 extends across lower portions of the first extensions 33a of the left and right down frame pipes 33.

A second cross frame 37 extends across vertical intermediate portions of the second extensions 33c of the left and right down frame pipes 33.

It is to be noted that the term "intermediate" used in the description of the present embodiment signifies a range which includes not only the center of the opposite ends of a target but also portions on the inner side between the opposite ends of the target.

The cross frames 36 and 37 are each formed from a round steel pipe extending in the leftward and rightward direction.

A cylindrical boss member 38 is joined to a lower end portion of each of the left and right down frame pipes 33 and extends along the leftward and rightward direction. A front engine hanger 39 is fixed at an upper end portion thereof between the left and right boss members 38 and supports a front end portion of the crankcase 11 of the engine 10 thereon. The front engine hanger 39 is formed, for example, by presswork of a steel plate.

A first gusset frame 41 extends across a front portion of each of the left and right main frame pipes 32 (front portion of the second extension 32c) and an upper portion of each of the left and right down frame pipes 33 (lower portion of the first extension 33a). The first gusset frame 41 extends in an upwardly rearwardly inclined relationship as viewed in a side elevational view.

A second gusset frame 42 extends across an intermediate portion in the forward and rearward direction of each of the left and right main frame pipes 32 (second curved portion 32d) and an upper portion of each of the left and right down frame pipes 33 (lower portion of the first extension 33a) below the left and right first gusset frames 41. The second gusset frame 42 extends in an upwardly rearwardly inclined relationship but somewhat less steeply than the first gusset frame 41 in a side elevational view.

Each of the gusset frames 41 and 42 is formed from a round steel pipe extending linearly.

A lower gusset 43 extends across upper portions of the left and right down frame pipes 33 (first extensions 33a) and a lower portion of the head pipe 21 in such a manner so as to fill up acute angle portions among them as viewed in a side elevational view. A lower portion of the lower gusset 43 extends such that it overlaps with the first curved portions 33b of the left and right down frame pipes 33.

A gusset plate 44 in the form of a flat plate extends across front portions of the left and right main frame pipes 32 (front portions of the first extensions 32a) and an upper portion of the head pipe 21 and is disposed so as to extend along an upper edge of the main frame 22 as viewed in a side elevational view.

The lower gusset 43 and the gusset plate 44 are formed, for example, by press work of a steel plate.

The seat frame 25 includes a seat frame main body 45 and a seat sub-frame 46. The seat frame main body 45 includes a pair of left and right side pipe portions 55 extending rearwardly in a rearwardly upwardly inclined relationship from an upper portion of the rear curved shape portion 32i of each of the left and right main frame pipes 32. The seat sub-frame 46 includes a pair of left and right sub-frame pipes 56 extending rearwardly in a rearwardly downwardly inclined relationship from an intermediate portion in the forward and rearward direction of each of the left and right main frame pipes 32 (front portion of the second extension 32c).

The seat frame main body 45 is formed in a U-shape open forwardly as viewed in a top plan view. The left and right side pipe portions 55 are joined at a front end portion 55f thereof to an upper portion of the rear curved shape portion 32i of the left and right main frame pipes 32.

Each side pipe portion 55 includes a first extension 55a, a second extension 55c, and a rear curved portion 55e. The first extension 55a extends rearwardly from an upper portion of the rear curved shape portion 32i of the main frame pipe 32 and particularly extends in an upwardly rearwardly inclined relationship as viewed in a side elevational view and in a leftwardly or rightwardly inwardly inclined relationship as viewed a top plan view. The second extension 55c is connected to a rear of the first extension 55a through a first curved portion 55b and extends in an aligned relationship with the first extension 55a as viewed in a side elevational view but in a leftwardly or rightwardly inwardly inclined relationship rather looser than the first extension 55a as viewed in a top plan view. The rear curved portion 55e is connected to a rear of the second extension 55c through a second curved portion 55d and extends in an upwardly inclined relationship rather steeply than the second extensions 55c as viewed in a side elevational view but is curved in an arc to the leftwardly and rightwardly inner side as viewed in a top plan view.

The left and right rear curved portions 55e are integrally connected to each other and are formed in a semicircular shape projection rearwardly as viewed in a top plan view. The left and right rear curved portions 55e are formed so as to extend along an outer profile of a rear portion 16a of the seat 16 as viewed in a top plan view at a rear location of the seat frame main body 45 such that it can support a load acting upon the seat 16 from an occupant upon acceleration of the vehicle. A rear portion of the seat frame main body 45 is formed like a frame extending along an outer profile of the rear portion 16a of the seat 16, and a flat plate portion 68a of a rear cross plate 68 hereinafter described is disposed on the inner side of a rear portion of the seat frame main body 45 such that it can support the load from the seat 16 over a wide area.

The left and right side pipe portions 55 are each formed as a unitary member by presswork of a round steel pipe or the like. Although, in the present embodiment, the entire seat frame main body 45 is formed as a unitary member, the seat frame main body 45 may otherwise be formed by joining of a plurality of steel pipes or the like.

A fifth cross frame 47 extends across rear portions of the second extensions 55c of the left and right side pipe portions 55.

A shock absorber connection bracket 48 is joined to the lower face side of a rear portion of the second extension 55c of each of the left and right side pipe portion 55. The shock absorber connection brackets 48 connect upper end portions of the left and right rear shock absorber 9 to each other.

The fifth cross frame 47 is formed from a round steel pipe extending the leftward and rightward direction. The shock absorber connection bracket 48 is formed by presswork of a steel pipe, casting or the like. The shock absorber connection bracket 48 has a fastening boss 48a provided thereon so as to project to the outer side in the widthwise direction.

The left and right sub-frame pipes 56 are provided to extend across front portions of the third extensions 32e of the left and right main frame pipes 32 and intermediate portions in the forward and rearward direction of the second extensions 55c of the left and right side pipe portions 55. The left and right sub-frame pipes 56 are joined at a front end portion 56f thereof to a front portion of the third extensions 32e of the left and right main frame pipes 32, respectively, and join, at a rear end portion 56b thereof, intermediate portions in the forward and rearward direction of the second extensions 55c of the left and right side pipe portions 55.

Each sub-frame pipe 56 includes a first extension 56a and a second extension 56c. The first extension 56a extends rearwardly from a front portion of the third extension 32e of the main frame pipe 32 and particularly extends in a downwardly rearwardly inclined relationship as viewed in a side elevational view and in a leftwardly or rightwardly inwardly inclined relationship as viewed in a top plan view. The second extension 56c is connected to the rear of the first extension 56a through a first curved portion 56b and extends linearly to the first extension 56a as viewed in a side elevational view but in a leftwardly or rightwardly outwardly inclined relationship as viewed in a top plan view.

The left and right sub-frame pipes 56 are each formed as a unitary member by presswork of a round steel pipe or the like. The round steel pipes which form the left and right sub-frame pipes 56 have a diameter smaller than that of the round steel pipe which forms the seat frame main body 45.

A sixth cross frame 49 extends across the first curved portions 56b of the left and right sub-frame pipes 56.

A gusset plate 51 extends across an intermediate portion in the forward and rearward direction of each of the left and right sub-frame pipes 56 (front portion of the second extension 56c) and the sixth cross frame 49, and is disposed so as to extend along an upper edge of the seat sub-frame 46 as viewed in a side elevational view.

A gusset frame 52 extends across the upper side of a rear portion of the second extension 56c of the sub-frame pipe 56 and the upper side of a rear portion of the second extension 55c of the side pipe portion 55, and extends in an upwardly rearwardly inclined relationship somewhat less steeply than the second extension 55c of the side pipe portion 55.

The cross frames and the gusset frames 52 are each formed from a round steel pipe. The gusset plate 51 is formed by presswork of a steel plate.

Figure 6:
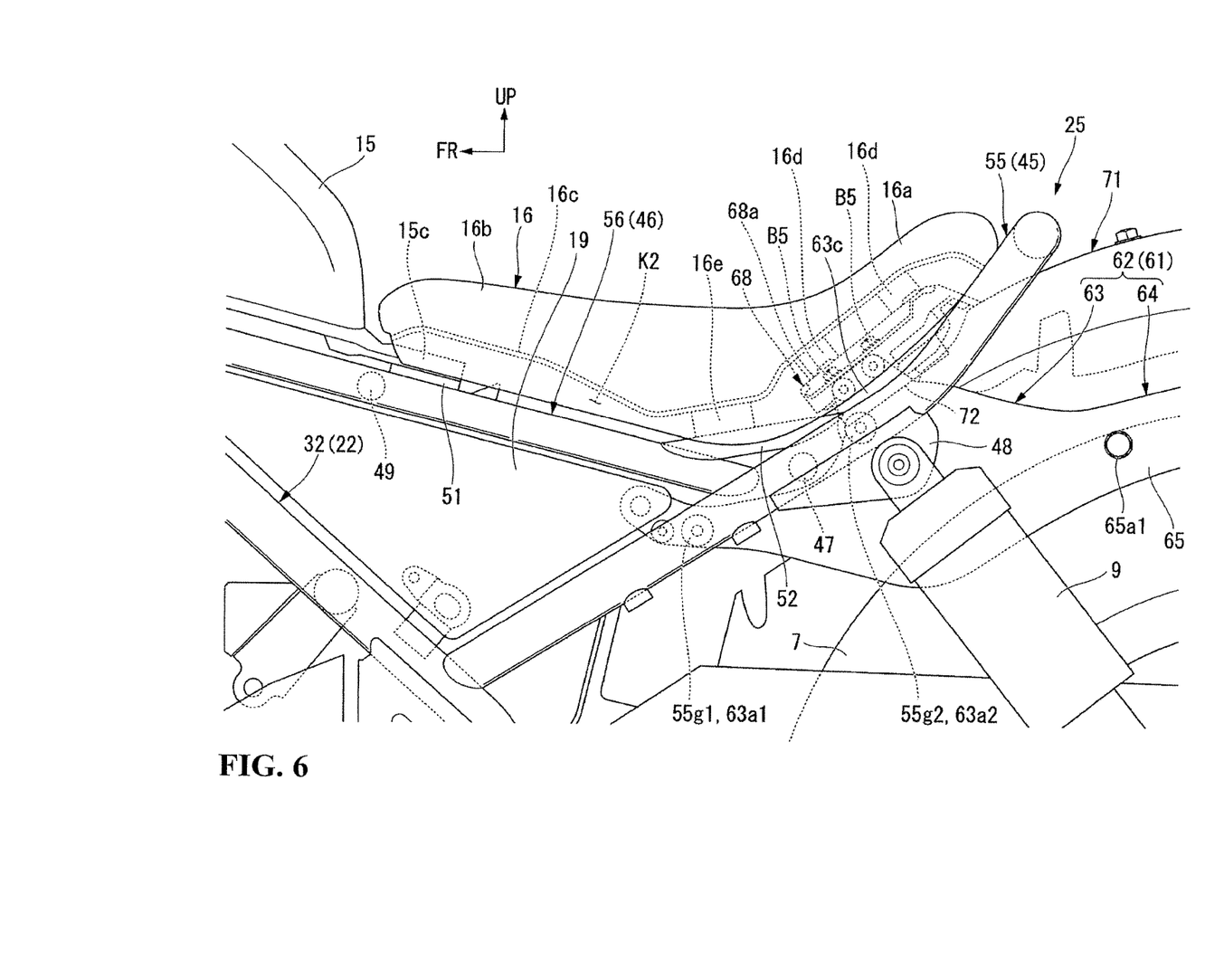
FIG. 6 is a left side elevational view of part of the motorcycle.
Figure 7:
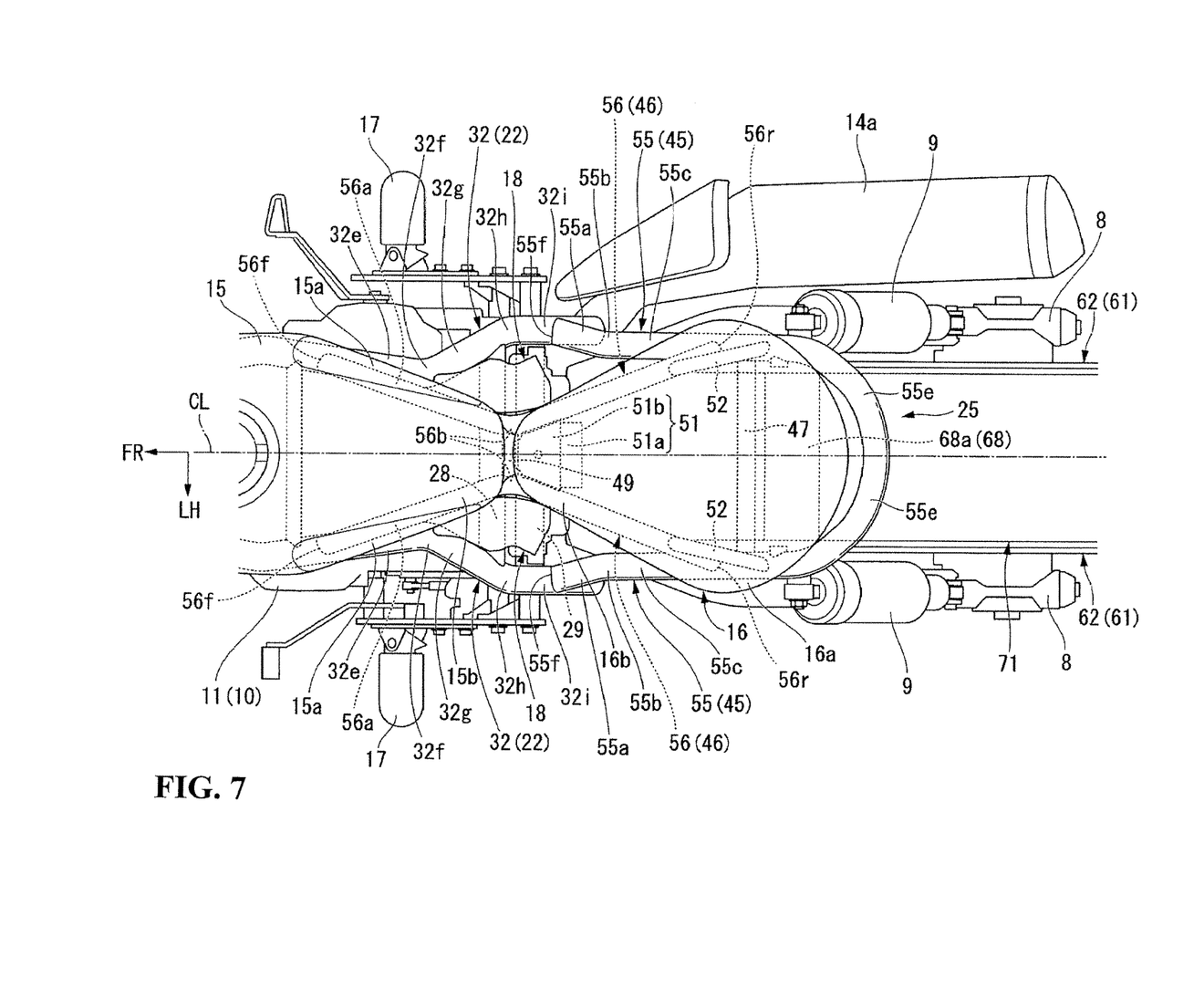
FIG. 7 is a top plan view of part of the motorcycle.
Figure 8:
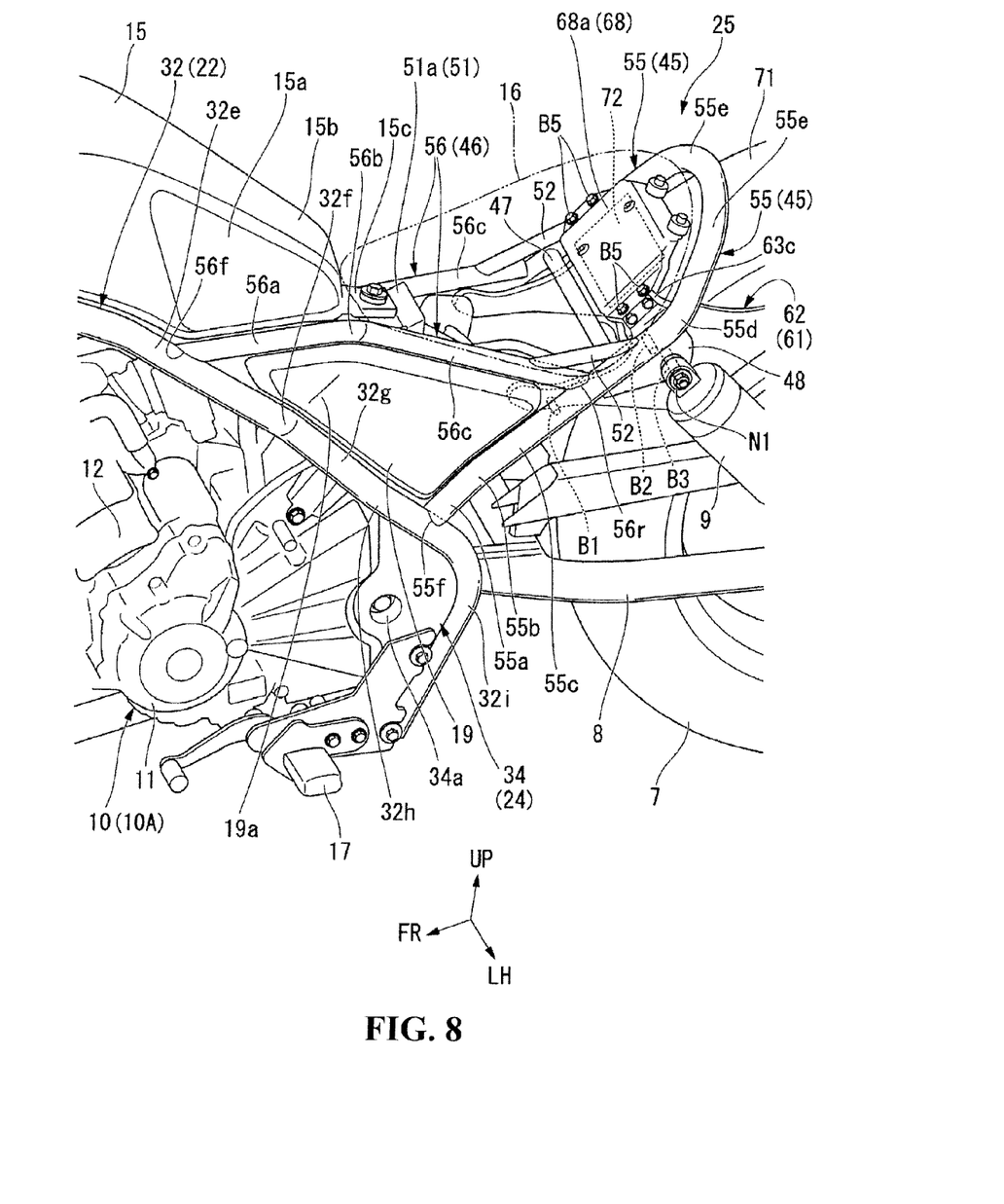
FIG. 8 is a perspective view of part of the motorcycle.
Figure 9:
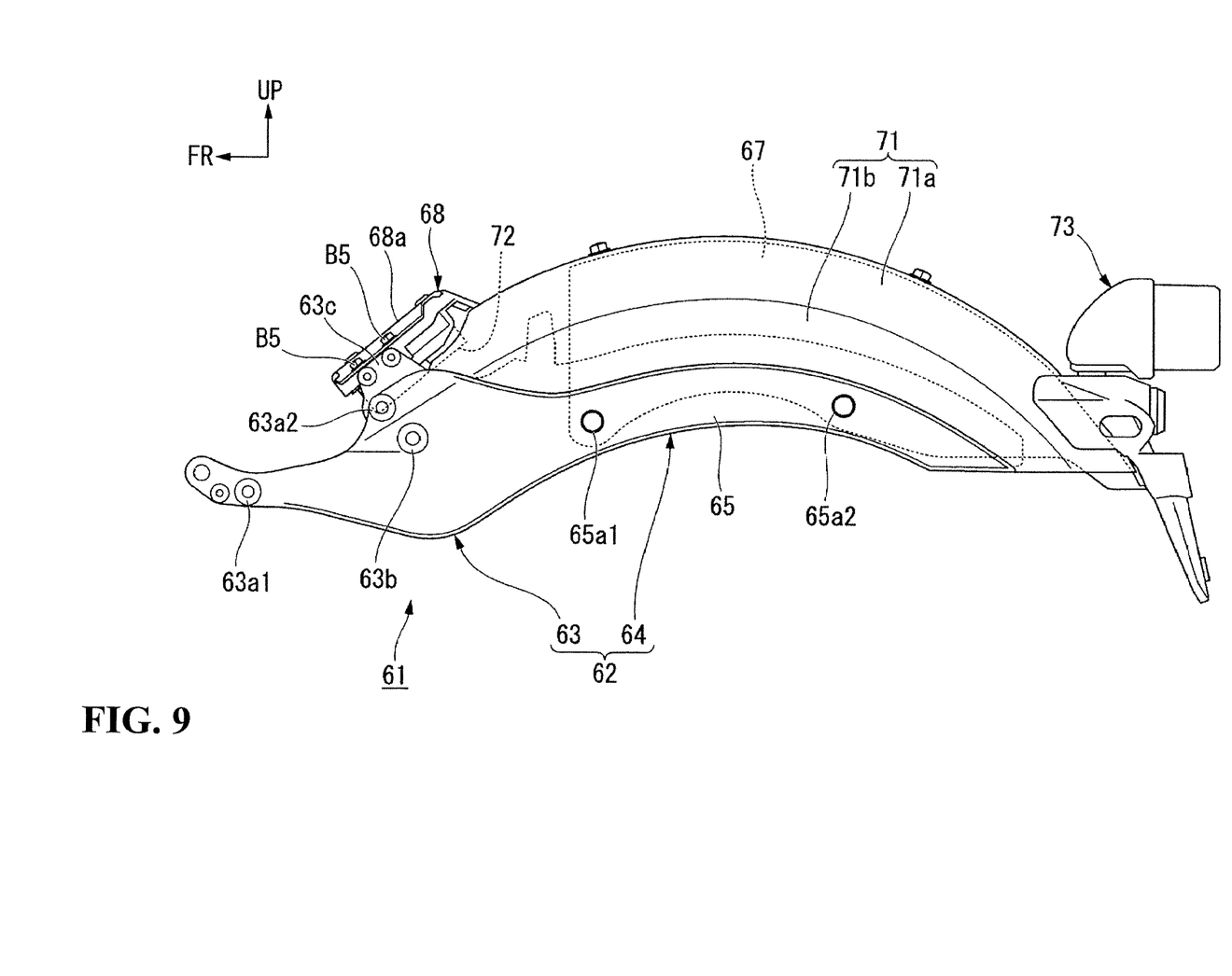
FIG. 9 is a left side elevational view of a rear frame and so forth of the motorcycle.

Referring also to FIGS. 6 to 8, the seat 16 is supported on the seat frame 25. The seat 16 is supported at the rear portion 16a thereof from the lower rear side thereof by rear portions of the seat frame main body 45 (rear portions of the first extensions 55a of the left and right side pipe portions 55, the second extensions 55c, and the rear curved portions 55e) and is supported at the front portion 16b thereof by rear portions of the seat sub-frame 46 (second extensions 56c of the left and right sub-frame pipes 56).

A seat front holding portion 51a is formed at a rear portion of the gusset plate 51 between the left and right sub-frame pipes 56. The seat front holding portion 51a receives a locking pawl not depicted, which is provided on a bottom plate 16c at the front portion 16b of the seat 16, fitted therein to support the bottom plate 16c. A tank rear fastening portion 51b is provided at a central portion of the gusset plate 51 and fastens a rear fastening flange 15c extending rearwardly from a rear lower end portion of the fuel tank 15.

The bottom plate 16c of the seat 16 and the left and right sub-frame pipes 56 are spaced from each other in the upward and downward direction and form therebetween an article disposition space K2 in which articles such as tools can be accommodated.

The rear portion 16a of the seat 16 is formed in an increased width shape swelling to the outer sides in the widthwise direction with respect to the seat frame main body 45 in order to support the buttocks of the occupant (rider) over a wide area.

The front portion 16b of the seat 16 is formed in a decreased width shape having a width substantially equal to the leftward and rightward width between the first curved portions 56b of the left and right sub-frame pipes 56 which configure a minimum width of the seat sub-frame 46 in order to suppress the opening of the occupant's legs.

In the fuel tank 15 positioned in front of the seat 16, a tank rear portion 15b which forms left and right knee grip portions 15a is formed such that the leftward and rightward width decreases toward the rear such that it can be sandwiched readily between the opposite knees of the rider seated on the seat 16. The leftward and rightward width of a rear end portion of the fuel tank 15 is substantially equal to the leftward and rightward width of a front end portion of the seat 16.

Third curved portions 32f of the left and right main frame pipes 32 are positioned forwardly downwardly of the first curved portions 56b of the left and right sub-frame pipes 56. The third curved portions 32f are formed in a recess shape dent to the inner side in the widthwise direction as viewed in a top plan view on the left and right main frame pipes 32. The legs of the rider seated on the seat 16 extend forwardly downwardly from the seat 16 and are disposed so as to range from side portions of the first curved portions 56b of the left and right sub-frame pipes 56 to side portions of the third curved portions 32f of the left and right main frame pipes 32. In this case, since projection of portions of the vehicle body frame 20 extending along the legs of the rider is suppressed, the boarding property, namely, the striding property, is improved, and the amenity and the ground accessibility are improved. Further, also from the fact that the steps 17 are positioned in front of the third curved portions 32f, the striding property of the motorcycle 1 of the cruiser type is improved.

The width in the leftward and rightward direction between the first curved portions 56b of the left and right sub-frame pipes 56 is smaller than the width in the leftward and rightward direction between the third curved portions 32f of the left and right main frame pipes 32. Consequently, projection of the first curved portions 56b of the left and right sub-frame pipes 56 with respect to the groin of the occupant is suppressed, and when the occupant places its foot on the ground not only during riding but also upon stopping, the occupant can place its foot readily. The side cover 19 is mounted in a triangular region surrounded by a rear portion of the main frame pipe 32 and front portions of the sub-frame pipe 56 and the side pipe portion 55 as viewed in a side elevational view. The side cover 19 has a recess portion 19a formed thereon in such a manner as to range from the first curved portion 56b of the sub-frame pipe 56 to the third curved portion 32f of the main frame pipe 32.

Referring to FIGS. 6 to 9, a rear frame 61 is connected to an intermediate portion in the forward and rearward direction of the seat frame main body 45 and includes a pair of left and right rear frame main bodies 62 which support vehicle parts thereon such as rear fenders 71.

The left and right rear frame main bodies 62 are each formed as a unitary member, for example, by aluminum casting or the like. The rear frame main bodies 62 are each formed as a plate whose thicknesswise direction coincides with the leftward and rightward direction.

Each of the left and right rear frame main bodies 62 includes a frame base portion 63 and a rear extension 64. The frame base portion 63 is disposed rearwardly downwardly of an upper portion of the second extension 55c of the side pipe portion 55 as viewed in a side elevational view. The rear extension 64 extends rearwardly in an arc projection upwardly as viewed in a side elevational view from a rear portion of the frame base portion 63.

The frame base portion 63 is provided such that it partially overlaps with an upper portion of the shock absorber connection bracket 48 and the rear shock absorber 9 as viewed in a side elevational view. The frame base portion 63 is exposed to the outer side of the vehicle at a rear lower portion of the seat frame main body 45 except portions overlapping with the shock absorber connection bracket 48 and the rear shock absorber 9. The inner side in the widthwise direction of the frame base portion 63 is thinned suitably to achieve reduction in weight while an appearance having a thickness is maintained.

The frame base portion 63 has, at a front portion thereof, front and rear fastening portions 63a1 and 63a2 and a cushion fastening portion 63b. The front and rear fastening portions 63a1 and 63a2 are disposed in such a manner as to overlap with the seat frame main body 45 as viewed in a side elevational view and are fastened to the seat frame main body 45 from the inner side in the widthwise direction by bolts B1 and B2 (refer to FIG. 8), respectively. The shock absorber fastening portion 63b is disposed in such a manner as to overlap with the shock absorber connection bracket 48 in a side elevational view and is fastened to the fastening boss 48a of the shock absorber connection bracket 48 by a bolt B3 (refer to FIG. 8) from the inner side in the widthwise direction.

Fastening bosses 55g1 and 55g2 are provided on the inner side in the widthwise direction of the seat frame main body 45 and fasten the front and rear fastening portions 63a1 and 63a2.

The bolt B3 which fastens the cushion fastening portion 63b to the shock absorber connection bracket 48 extends through the fastening boss 48a and projects to the outer side in the widthwise direction, and a nut N1 (refer to FIG. 8) is screwed with the bolt B3 to fasten an upper end portion of the rear shock absorber 9. In particular, a front portion of the rear frame 61 and an upper end portion of the rear shock absorber 9 are connected by fastening together to the shock absorber connection bracket 48.

The rear extension 64 is curved to as to extend along a shape, as viewed in a side elevational view, of the rear fender 71 (and the rear wheel 7) supported between the left and right rear frame main bodies 62. The rear fender 71 has a fender outer peripheral portion 71a having a curved shape similar to that of an outer peripheral face (tread face) of the rear wheel 7 and a fender side wall portion 71b extending toward the inner periphery side from a side edge of the fender outer peripheral portion 71a. A tail lamp unit 73 is supported at a rear end portion of the rear fenders 71.

The rear extension 64 is provided so as to extend along the outer side of the fender side wall portion 71b as viewed in a side elevational view. The rear extension 64 has an exposure portion 65 which forms an outer side face which lies in flush with the frame base portion 63 and is exposed to the appearance of the vehicle. The exposure portion 65 has front and rear fastening portions 65a1 and 65a2 for a fender inner 67 for connecting the left and right rear frame main bodies 62 to each other. The fender inner 67 is an article formed by presswork, for example, of a steel plate and is formed so as to extend along a lower face of the fender outer peripheral portion 71a. The fender inner 67 supports the fender outer peripheral portion 71a from the inner side (from below) of the rear fender 71.

A cross plate coupling portion 63c is provided on the upper side of a front portion of the frame base portion 63 and couples an outer side portion of the rear cross plate 68. The rear cross plate 68 connects front portions of the left and right rear frame main bodies 62 to each other (front portions of the left and right frame base portions 63 to each other).

The rear cross plate 68 includes the flat plate portion 68a inclined forwardly downwardly so as to extend along a front portion of the rear fender 71 as viewed in a side elevational view. The flat plate portion 68a is formed in a rectangular shape having front and rear sides extending along the widthwise direction. Left and right side portions of the flat plate portion 68a are fastened to the cross plate coupling portion 63c of the frame base portion 63, for example, by a pair of front and rear bolts B5.

The flat plate portion 68a is contacted from the front upper side by a plurality of cushion rubber members 16d held on the bottom plate 16c by the rear portion 16a of the seat 16, and consequently, the rear portion 16a of the seat 16 is supported on the rear cross plate 68. The bottom plate 16c is generally supported on the seat frame 25 including the cushion rubber member 16e which contacts with the left and right gusset frames 52 and so forth in addition to the cushion rubber members 16d, and the article disposition space K2 below the seat 16 is assured.

An electrical part (vehicle component) 72 which requires heat dissipation such as, for example, a regulator is attached to a lower portion of the flat plate portion 68a.

As described above, the motorcycle 1 of the embodiment described above is a saddle type vehicle which includes a head pipe 21, a main frame 22 extending obliquely downwardly from the head pipe 21, and a seat frame 25 which supports a seat 16 thereon. The main frame 22 includes a first inclination portion (third extension 32e) inclined so as to be positioned on the inner side in a widthwise direction toward the rear of the vehicle and a front end portion 56f of the seat frame 25 is connected to the first inclination portion while the seat frame 25 has a second inclination portion (first extension 56a) inclined so as to be positioned on the inner side in the widthwise direction toward the rear of the vehicle from the front end portion 56f.

With the configuration just described, since the front end portion 56f of the seat frame 25 is connected to the first inclination portion which narrows to the inner side in the widthwise direction of the main frame 22, a peripheral portion of the seat 16 is less likely to project to the outer side in the widthwise direction. Further, since the second inclination portion which narrows in the widthwise direction is provided also behind the front end portion 56f of the seat frame 25, swelling of the seat frame 25 just below the seat 16 to the outer side in the widthwise direction is suppressed. Consequently, the width of the vehicle body around the seat 16 can be suppressed, and the boarding property (striding property) can be improved.

Further, the motorcycle 1 described above is configured such that the second inclination portion (first extension 56a) of the seat frame 25 is provided in an inclined relationship to the inner side in the widthwise direction with respect to the first inclination portion (third extension 32e) of the main frame 22 as viewed in a top plan view.

With the configuration just described, since the second inclination portion of the seat frame 25 is inclined to the rather inner side in the widthwise direction in the rear of the second inclination portion of the main frame 22, the inclination of the main frame 22 can be suppressed thereby to enhance the degree of freedom in design and the vehicle body width of the seat frame 25 just below the seat 16 can be suppressed thereby to further improve the striding property.

The motorcycle 1 described above is configured such that the seat frame 25 includes a first seat frame (seat sub-frame 46) inclined so as to be positioned downwardly toward the rear of the vehicle and a second seat frame (seat frame main body 45) inclined so as to be positioned upwardly toward the rear of the vehicle, and the first seat frame is connected at a rear end portion 56b thereof to an intermediate position in the forward and rearward direction of the second seat frame while the second seat frame supports the seat 16 from the lower rear side at a rear portion thereof.

With the configuration just described, since the height of the seat is reduced by the rearwardly downwardly inclined first seat frame (seat sub-frame 46), the ground accessibility can be improved, and the load applied to the seat 16 from an occupant upon acceleration of the vehicle can be supported firmly by a rear portion of the second seat frame (seat frame main body 45).

Further, the motorcycle 1 described hereinabove is configured such that the second seat frame is formed from a continuous pipe material and is formed so as to extend along an outer profile of the seat 16 as viewed in a top plan view.

With the configuration just described, assurance of the rigidity and fabrication of the seat frame 25 are facilitated, and the load applied to the seat 16 from an occupant upon acceleration of the vehicle can be supported more firmly by the second seat frame extending along an outer profile of the seat 16.

Further, the motorcycle 1 described above is configured such that the first seat frame is formed from a pipe material having a diameter smaller than that of the second seat frame.

With the configuration just described, since the first seat frame which supports the front portion 16b of the seat 16 is thinner than the second seat frame which supports the rear portion 16a of the seat 16, it is possible to suppress the vehicle body width of a front portion of the seat frame 25 and further improve the striding property.

Further, the motorcycle 1 described above is configured such that an article disposition space K2 is formed between the first seat frame and a bottom plate 16c of the seat 16.

With the configuration just described, the space below the front portion 16b of the seat 16 can be utilized as an article disposition space or an article accommodation unit, and the convenience can be improved.

Further, the motorcycle 1 described above is configured such that it further includes a frame-shaped second seat frame (seat frame main body 45) formed so as to extend along an outer profile of the seat 16 as viewed in a top plan view and a seat supporting member (rear cross plate 68) fixed on the inner side of the second seat frame and capable of supporting the inner side of the outer profile of the seat 16 as viewed in a top plan view, the second seat frame and the seat supporting member being provided in the rear of the article disposition space K2 in the vehicle forward and rearward direction.

With the configuration just described, since the seat 16 is supported over a wide area using the seat supporting member (rear cross plate 68) in addition to the second seat frame (seat frame main body 45), the load applied to the seat 16 from the occupant upon acceleration of the vehicle can be supported more firmly.

Further, the motorcycle 1 described above is configured such that the seat supporting member (rear cross plate 68) has a flat plate portion 68a which supports a bottom plate 16c of the seat 16 on a front face side thereof, and a different vehicle component (electrical part 72) is supported on a rear face side of the flat plate portion 68a.

With the configuration just described, the space on the rear face side of the flat plate portion 68a of the seat supporting member can be effectively used as a part disposition space and the flat plate portion 68a of the seat supporting member can be used also as a protective member for the vehicle component.

Further, the motorcycle 1 described above is configured such that it further includes a down frame 23 extending downwardly from the head pipe 21, a pivot frame 24 coupled to a rear portion of the main frame 22, and an engine 10 mounted so as to be surrounded by the down frame 23, the pivot frame 24, and the main frame 22, and the down frame 23 and the pivot frame 24 are connected to each other through the engine 10.

With the configuration just described, the engine 10 is utilized as a rigid member of the vehicle body frame 20, and therefore, a frame member for connecting the down frame 23 and the pivot frame 24 to each other can be eliminated and reduction in weight of the vehicle can be anticipated.

It is to be noted that the present invention is not limited to the embodiment described above, and for example, the main frame is not limited to that which includes a pair of left and right frame members but may be configured such that a single main frame has a portion inclined such that it is positioned on the inner side in the widthwise direction toward the rear side. Similarly, the seat frame is not limited to that which includes a pair of left and right frame members but may be configured such that a single seat frame has a portion inclined such that it is positioned on the inner side in the widthwise direction toward the rear side. Further, the steel pipe used for the vehicle body frame is not limited to a round steel pipe but may be any of steel pipes having various cross sectional shapes such as a square sectional shape. Further, the material for the vehicle body frame is not limited to a steel pipe but may be any material fabricated by various methods for construction such as presswork or casting.

Further, the seat sub-frame 46 may extend to a location on the lower rear side of the seat 16 to support the rear portion 16a of the seat 16 from the lower rear side and a rear end portion of the seat frame main body 45 may be connected to an intermediate portion in the forward and rearward direction of the seat sub-frame 46 to support the seat sub-frame 46 from below. Furthermore, the seat frame 25 may be removably connected to the main frame 22 by fastening or the like.

The saddle type vehicle includes vehicles in general wherein a driver boards astride a vehicle body and includes not only a motorcycle but also three-wheeled (including not only a type which includes one front wheel and two rear wheels but also a different type which includes two front wheels and one rear wheel) or four-wheeled vehicles. The saddle type vehicle includes vehicles wherein an electric motor is included in a power unit.

The configuration of the embodiment described above is an example of the present invention and can be modified in various manners without departing from the spirit and scope of the present invention such as to replace a component in the embodiment with a well-known component.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle comprising:
a head pipe;
a main frame extending in a vehicle rearward direction from the head pipe; and
a seat frame connected to a rear of the vehicle of the main frame,
wherein the main frame has a first inclination portion inclined so as to be positioned on an inner side in a widthwise direction toward the rear of the vehicle,
wherein the seat frame is connected at a front end portion thereof to the first inclination portion,
wherein the seat frame has a second inclination portion inclined so as to be positioned on the inner side in the widthwise direction toward the rear of the vehicle from the front end portion of the seat frame, and
wherein the seat frame includes:
a first seat frame inclined so as to be positioned downwardly toward the rear of the vehicle; and
a second seat frame inclined so as to be positioned upwardly toward the rear of the vehicle,
wherein the first seat frame is connected at a rear end portion thereof to an intermediate portion in the forward and rearward direction of the second seat frame and the second seat frame supports, at a rear portion thereof, a seat from a lower rear side.

2. The saddle vehicle according to claim 1, wherein the second inclination portion of the seat frame is provided in an inclined relationship so as to be positioned on the inner side in the widthwise direction than the first inclination portion of the main frame as viewed in a top plan view.

3. The saddle vehicle according to claim 1, wherein the second seat frame is formed from a continuous pipe material and extends along an outer profile of the seat as viewed in a top plan view.

4. The saddle vehicle according to claim 1, wherein the first seat frame is formed from a pipe material of a diameter smaller than that of the second seat frame.

5. The saddle vehicle according to claim 2, wherein the first seat frame is formed from a pipe material of a diameter smaller than that of the second seat frame.

6. The saddle vehicle according to claim 1, wherein an article disposition space is formed between the first seat frame and a bottom plate of the seat.

7. The saddle vehicle according to claim 3, wherein an article disposition space is formed between the first seat frame and a bottom plate of the seat.

8. The saddle vehicle according to claim 4, wherein an article disposition space is formed between the first seat frame and a bottom plate of the seat.

9. The saddle vehicle according to claim 6, wherein the second seat frame of a frame shape extends along the outer profile of the seat as viewed in a top plan view and a seat supporting member fixed to an inner side of the second seat frame and capable of supporting an inner side of the outer profile of the seat as viewed in the top plan view are provided in the rear of the article disposition space in the vehicle forward and rearward direction.

10. The saddle vehicle according to claim 9, wherein the seat supporting member has a flat plate portion which supports the bottom plate of the seat on a front face side thereof, and a different vehicle component is supported on a rear face side of the flat plate portion.

11. The saddle vehicle according to claim 1, further comprising:
a down frame extending downwardly from the head pipe;
a pivot frame coupled to a rear portion of the main frame; and
an engine mounted so as to be surrounded by the down frame, the pivot frame, and the main frame;
wherein the down frame and the pivot frame are connected to each other through the engine.

12. The saddle vehicle according to claim 2, further comprising:
a down frame extending downwardly from the head pipe;
a pivot frame coupled to a rear portion of the main frame; and
an engine mounted so as to be surrounded by the down frame, the pivot frame, and the main frame;
wherein the down frame and the pivot frame are connected to each other through the engine.

13. The saddle vehicle according to claim 3, further comprising:
a down frame extending downwardly from the head pipe;
a pivot frame coupled to a rear portion of the main frame; and
an engine mounted so as to be surrounded by the down frame, the pivot frame, and the main frame;
wherein the down frame and the pivot frame are connected to each other through the engine.

14. A saddle vehicle comprising:
a head pipe;
a main frame extending rearwardly from the head pipe;
a seat frame connected to a rear of the vehicle of the main frame;
a down frame extending downwardly from the head pipe;
a pivot frame coupled to a rear portion of the main frame; and
an engine mounted surrounded by the down frame, the pivot frame, and the main frame, said down frame and the pivot frame being connected to each other through the engine,
wherein the main frame has a first inclination portion inclined so as to be positioned on an inner side in a widthwise direction toward the rear of the vehicle,
wherein the seat frame is connected at a front end portion thereof to the first inclination portion and the seat frame has a second inclination portion inclined so as to be positioned on the inner side in the widthwise direction toward the rear of the vehicle from the front end portion of the seat frame, and
wherein the seat frame includes:
a first seat frame inclined so as to be positioned downwardly toward the rear of the vehicle; and
a second seat frame inclined so as to be positioned upwardly toward the rear of the vehicle,
wherein the first seat frame is connected at a rear end portion thereof to an intermediate portion in the forward and rearward direction of the second seat frame and the second seat frame supports, at a rear portion thereof, a seat from a lower rear side.

15. The saddle vehicle according to claim 14, wherein the second inclination portion of the seat frame is provided in an inclined relationship so as to be positioned on the inner side in the widthwise direction than the first inclination portion of the main frame as viewed in a top plan view.

16. The saddle vehicle according to claim 14, wherein the second seat frame is formed from a continuous pipe material and extends along an outer profile of the seat as viewed in a top plan view.

17. The saddle vehicle according to claim 14, wherein the first seat frame is formed from a pipe material of a diameter smaller than that of the second seat frame.

\* \* \* \* \*